(12) United States Patent
Blanchard et al.

(10) Patent No.: US 6,312,067 B1
(45) Date of Patent: Nov. 6, 2001

(54) ORGANIZING SYSTEM FOR HUNTING SAFETY

(76) Inventors: Douglas Blanchard; Robert Klein, both of 62 Cranbrook Rd., Trenton, NJ (US) 08690

(*) Notice: Subject to any disclaimer, the term of this patent is extended or adjusted under 35 U.S.C. 154(b) by 0 days.

(21) Appl. No.: 09/583,651

(22) Filed: May 30, 2000

Related U.S. Application Data

(60) Provisional application No. 60/136,349, filed on May 28, 1999.

(51) Int. Cl.[7] .................................................. A47B 81/00
(52) U.S. Cl. ........................ 312/102; 312/245; 312/234.1; 40/657
(58) Field of Search ..................................... 312/100, 101, 312/102, 245, 242, 114, 118, 138.1, 234, 234.1, 234.2; 40/657, 904

(56) References Cited

U.S. PATENT DOCUMENTS

| | | | |
|---|---|---|---|
| 900,342 | * 10/1908 | Ward | 312/234.1 |
| 996,521 | * 6/1911 | Pile | 40/657 |
| 1,454,985 | * 5/1923 | Tate | 40/657 X |
| 1,559,647 | * 11/1925 | Roth | 312/128 |
| 1,759,544 | * 5/1930 | Croes | 312/245 X |
| 1,948,738 | * 2/1934 | Thayer | 312/234 |
| 2,315,158 | * 3/1943 | Markham | 312/100 |
| 4,209,212 | * 6/1980 | McGoldrick | 312/245 |

FOREIGN PATENT DOCUMENTS

26701 * of 1913 (GB) ..................................... 40/657

* cited by examiner

Primary Examiner—Peter M. Cuomo
Assistant Examiner—James O. Hansen
(74) Attorney, Agent, or Firm—Goldstein Law Offices P.C

(57) ABSTRACT

An organizing system for hunting safety including a housing securable to a tree or the like. The housing has an open forward face. The open forward face has a pair of transparent covers hingedly coupled thereto. An area map is disposed within the housing. The area map is related to an area where the housing is secured. The area map has numbers disposed thereon corresponding with particular areas of the map. A pair of tag boards are disposed on an interior surface of the rear vertical wall of the housing. The pair of tag boards include a first board having location hooks corresponding with the numbers on the area map. A second tag board corresponds with individual hunters. An identification listing is disposed on the area map. The identification listing has a listing of hunters names thereon with corresponding identification numbers. A plurality of identification tags are provided having numbers disposed thereon corresponding with the identification numbers of the hunters. The identification numbers are adapted for coupling with the pair of tag boards.

6 Claims, 1 Drawing Sheet

ORGANIZING SYSTEM FOR HUNTING SAFETY

CROSS REFERENCES AND RELATED SUBJECT MATTER

This application relates to subject matter contained in provisional patent application serial No. 60/136,349, filed in the United States Patent Office on May 28, 1999.

BACKGROUND OF THE INVENTION

The present invention relates to an organizing system for hunting safety and more particularly pertains to identifying areas where hunters are located in order to alert others of their location.

Hunting is a very popular activity in North America and throughout the world. Hunting does present many dangers, particularly when numerous hunters are in one area. This often results in the hunters being accidentally shot or having near misses. Most of the hunters do not know where the other hunters are located and also have difficulty seeing them due to the camouflage attire that is typically worn. Additionally, when a large hunting party is out in one area, and at the end of the hunting trip, it is often difficult to determine if the entire party has returned from the area that was being hunted.

The present invention attempts to solve these problems by providing an organizing system that will alert other hunters as to the exact location of other hunters in a particular area while at the same time enabling other hunters to know whether or not a particular hunter is out in the area at a particular time.

The use of hunting devices is known in the prior art. More specifically, hunting devices heretofore devised and utilized for the purpose of aiding those who are hunting are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe an organizing system for hunting safety for identifying areas where hunters are located in order to alert others of their location.

In this respect, the organizing system for hunting safety according to the present invention substantially departs from the conventional concepts and designs of the prior art, and in doing so provides an apparatus primarily developed for the purpose of identifying areas where hunters are located in order to alert others of their location.

Therefore, it can be appreciated that there exists a continuing need for new and improved organizing system for hunting safety which can be used for identifying areas where hunters are located in order to alert others of their location. In this regard, the present invention substantially fulfills this need.

SUMMARY OF THE INVENTION

In the view of the foregoing disadvantages inherent in the known types of hunting devices now present in the prior art, the present invention provides an improved organizing system for hunting safety. As such, the general purpose of the present invention, which will be described subsequently in greater detail, is to provide a new and improved organizing system for hunting safety and method which has all the advantages of the prior art and none of the disadvantages.

To attain this, the present invention essentially comprises a housing securable to a tree or the like. The housing has a rear vertical wall, a bottom horizontal wall, a pair of side walls extending forwardly from the rear vertical wall and upwardly from the bottom horizontal wall, and an open forward face. The open forward face has a pair of transparent covers hingedly coupled thereto. Each of the covers have a handle extending outwardly therefrom. The covers have a lockable clasp extending therebetween. An area map is disposed within the housing at a position elevated above the bottom horizontal wall. The area map is related to an area where the housing is secured. The area map has numbers disposed thereon corresponding with particular areas of the map. A pair of tag boards are disposed on an interior surface of the rear vertical wall of the housing. The pair of tag boards include a first board having location hooks corresponding with the numbers on the area map. A second tag board corresponds with individual hunters. An identification listing is disposed on the area map. The identification listing has a listing of hunters names thereon with corresponding identification numbers. A plurality of identification tags are provided having numbers disposed thereon corresponding with the identification numbers of the hunters. The identification numbers are adapted for coupling with the pair of tag boards. A lower compartment is disposed within the housing intermediate the bottom horizontal wall and the area map.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved organizing system for hunting safety which has all the advantages of the prior art hunting devices and none of the disadvantages.

It is another object of the present invention to provide a new and improved organizing system for hunting safety which may be easily and efficiently manufactured and marketed.

It is a further object of the present invention to provide a new and improved organizing system for hunting safety which is of durable and reliable construction.

An even further object of the present invention is to provide a new and improved organizing system for hunting safety which is susceptible of a low cost of manufacture with regard to both materials and labor, and which accordingly is then susceptible of low prices of sale to the consuming public, thereby making such an organizing system for hunting safety economically available to the buying public.

Even still another object of the present invention is to provide a new and improved organizing system for hunting safety for identifying areas where hunters are located in order to alert others of their location.

Lastly, it is an object of the present invention to provide a new and improved organizing system for hunting safety including a housing securable to a tree or the like. The housing has an open forward face. The open forward face has a pair of transparent covers hingedly coupled thereto. An area map is disposed within the housing. The area map is related to an area where the housing is secured. The area map has numbers disposed thereon corresponding with particular areas of the map. A pair of tag boards are disposed on an interior surface of the rear vertical wall of the housing. The pair of tag boards include a first board having location hooks corresponding with the numbers on the area map. A second tag board corresponds with individual hunters. An identification listing is disposed on the area map. The identification listing has a listing of hunters names thereon with corresponding identification numbers. A plurality of identification tags are provided having numbers disposed thereon corresponding with the identification numbers of the hunters. The identification numbers are adapted for coupling with the pair of tag boards.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
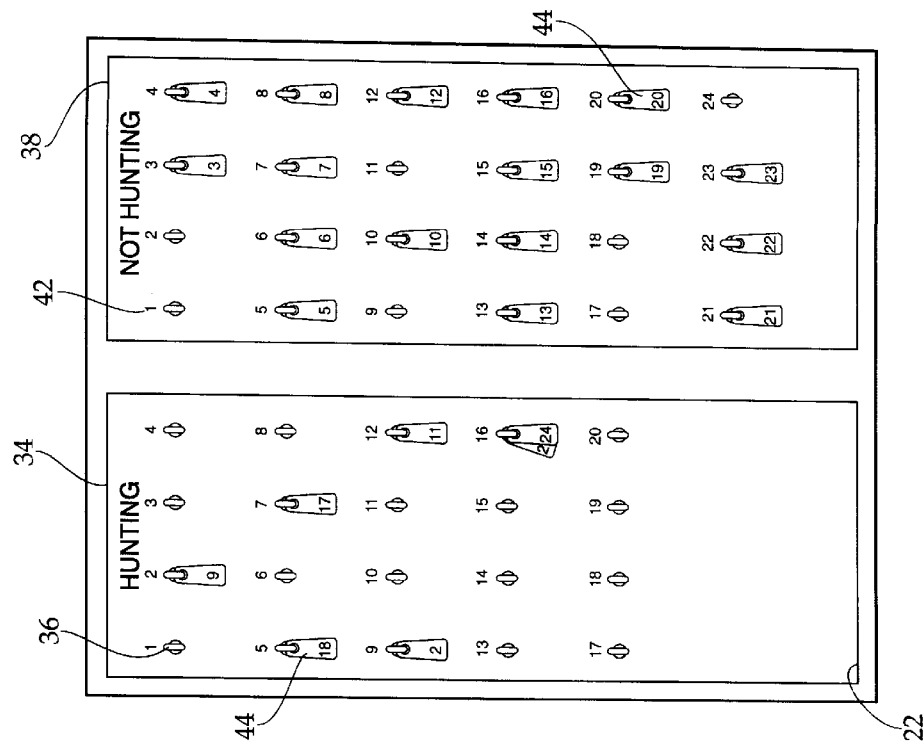
FIG. 2 is a front elevation view of the present invention.
Figure 1:
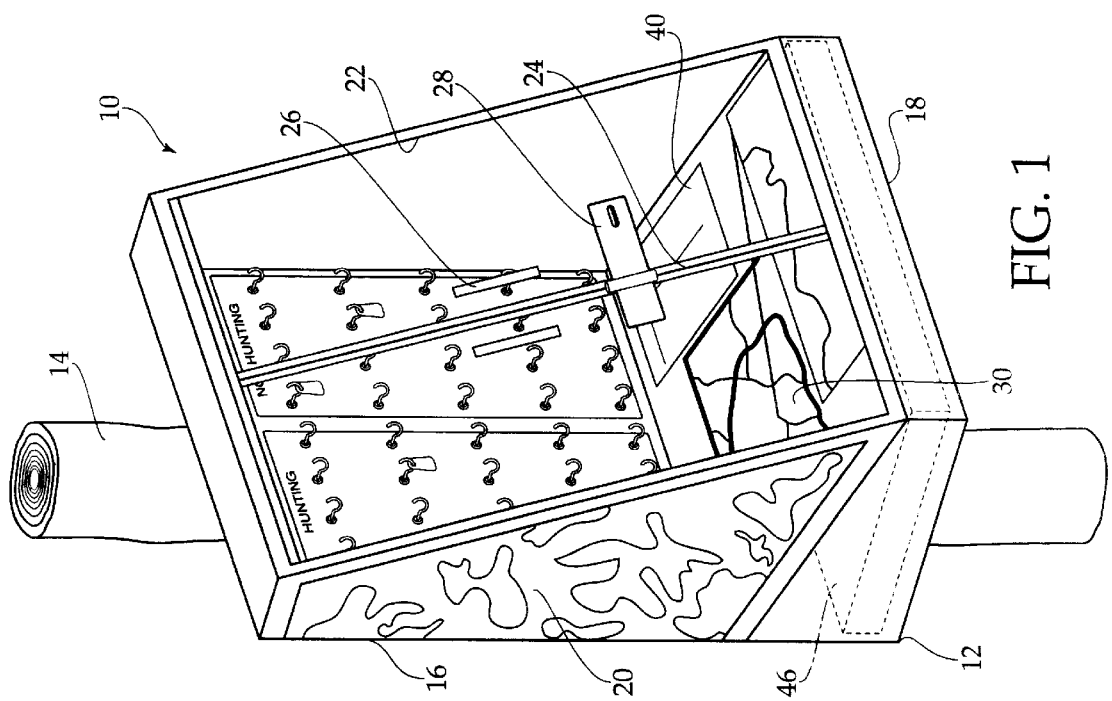
FIG. 1 is a perspective view of the preferred embodiment of the organizing system for hunting safety constructed in accordance with the principles of the present invention.

With reference now to the drawings, and in particular, to FIGS. 1 and 2 thereof, the preferred embodiment of the new and improved organizing system for hunting safety embodying the principles and concepts of the present invention and generally designated by the reference number 10 will be described.

Specifically, it will be noted in the various Figures that the device relates to a organizing system for hunting safety for identifying areas where hunters are located in order to alert others of their location. In its broadest context, the device consists of a housing, an area map, a pair of tag boards, an identification listing, a plurality of identification tags, and a lower compartment. Such components are individually configured and correlated with respect to each other so as to attain the desired objective.

The housing 12 is securable to a tree 14 or the like. Note FIG. 1. The securement of the housing 12 to the tree will be done using standard securement hardware known in the art. The housing 12 has a rear vertical wall 16, a bottom horizontal wall 18, a pair of side walls 20 extending forwardly from the rear vertical wall 16 and upwardly from the bottom horizontal wall 18, and an open forward face 22. Each of the walls, particularly the side walls 20, can be painted in camouflage colors to blend in with atmosphere. The open forward face 22 has a pair of transparent covers 24 hingedly coupled thereto. The transparent covers 24 allow for the contents of the housing 12 to be visualized without having to be opened. Each of the covers 24 have a handle 26 extending outwardly therefrom. The covers 24 have a lockable clasp 28 extending therebetween. The securement of the covers 24 will create a water and air-tight seal to protect the contents therein, discussed hereinafter.

The area map 30 is disposed within the housing 12 at a position elevated above the bottom horizontal wall 18. The area map 30 is related to an area where the housing 12 is secured. The area map 30 has numbers disposed thereon corresponding with particular areas of the map. These numbers, which have been omitted from the figures for clarity, will designate particular area on the map that will identify particular areas for hunters. Alternately, these numbers could be used to identify certain tree stands.

The pair of tag boards are disposed on an interior surface of the rear vertical wall 16 of the housing 12. The pair of tag boards include a first board 34 having location hooks 36 corresponding with the numbers on the area map 30. A second tag board 38 corresponds with individual hunters. The second tag board 38 is also provided with hooks similar to the first tag board 34.

The identification listing 40 is disposed on the area map 30. The identification listing 40 has a listing of hunters names thereon with corresponding identification numbers 42. These identification numbers 42 are also listed on the second tag board 38 above a corresponding hook.

The plurality of identification tags 44 have numbers disposed thereon corresponding with the identification numbers 42 of the hunters. The identification tags 44 are adapted for coupling with the pair of tag boards 34,38. The tags 44 will be placed according to the activity of the corresponding hunter. If the hunter is out in the map area hunting, then his tag 44 would be placed on the first tag board 34 in the location hook 36 where he is hunting. When the hunter is not out hunting, or returns from hunting, his tag 44 is placed on the second tag board 38 to signify that he is not out in the area hunting.

The lower compartment 46 is disposed within the housing 12 intermediate the bottom horizontal wall 18 and the area map 30. The lower compartment 46 provides a place for the storage of particular items, such as hunting licences and permits, and is accessible only by unlocking the housing 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United tates is as follows:

1. An organizing system for hunting safety for identifying areas where hunters are located in order to alert others of their location comprising, in combination:

a housing securable to a tree, the housing having a rear vertical wall, a bottom horizontal wall, a pair of side walls extending forwardly from the rear vertical wall and upwardly from the bottom horizontal wall, and an open forward face, the open forward face having a pair of transparent covers hingedly coupled thereto, each of the covers having a handle extending outwardly therefrom, the covers having a lockable clasp extending therebetween;

an area map disposed within the housing at a position elevated above the bottom horizontal wall, the area map being related to an area where the housing is secured, the area map having numbers disposed thereon corresponding with particular areas of the map;

a pair of tag boards disposed on an interior surface of the rear vertical wall of the housing, the pair of tag boards including a first board having location hooks corresponding with the numbers on the area map, a second tag board corresponding with individual hunters;

an identification listing disposed on the area map, the identification listing having a listing of hunters names thereon with corresponding identification numbers;

a plurality of identification tags having numbers disposed thereon corresponding with the identification numbers of the hunters, the identification numbers being adapted for coupling with the pair of tag boards;

a lower compartment disposed within the housing intermediate the bottom horizontal wall and the area map.

2. An organizing system for hunting safety for identifying areas where hunters are located in order to alert others of their location comprising, in combination:

a housing securable to a tree, the housing having an open forward face, the open forward face having a pair of transparent covers hingedly coupled thereto;

an area map disposed within the housing, the area map being related to an area where the housing is secured, the area map having numbers disposed thereon corresponding with particular areas of the map;

a pair of tag boards disposed on an interior surface of the rear vertical wall of the housing, the pair of tag boards including a first board having location hooks corresponding with the numbers on the area map, a second tag board corresponding with individual hunters;

an identification listing disposed on the area map, the identification listing having a listing of hunters names thereon with corresponding identification numbers;

a plurality of identification tags having numbers disposed thereon corresponding with the identification numbers of the hunters, the identification numbers being adapted for coupling with the pair of tag boards.

3. The organizing system for hunting safety as set forth in claim 2 wherein the housing has a rear vertical wall, a bottom horizontal wall, a pair of side walls extending forwardly from the rear vertical wall and upwardly from the bottom horizontal wall.

4. The organizing system for hunting safety as set forth in claim 3 and further including a lower compartment disposed within the housing intermediate the bottom horizontal wall and the area map.

5. The organizing system for hunting safety as set forth in claim 2 wherein each of the covers have a handle extending outwardly therefrom.

6. The organizing system for hunting safety as set forth in claim 2 wherein the covers have a lockable clasp extending therebetween.

* * * * *